US010393902B2

(12) United States Patent
Hornman et al.

(10) Patent No.: US 10,393,902 B2
(45) Date of Patent: Aug. 27, 2019

(54) METHOD AND SYSTEM FOR ACQUISITION OF SEISMIC DATA

(71) Applicant: SHELL OIL COMPANY, Houston, TX (US)

(72) Inventors: Johan Cornelis Hornman, Rijswijk (NL); Peter Berkeley Wills, Houston, TX (US); Jorge Luis Lopez, Bellaire, TX (US); Albena Alexandrova Mateeva, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 212 days.

(21) Appl. No.: 15/510,955

(22) PCT Filed: Sep. 10, 2015

(86) PCT No.: PCT/US2015/049451
§ 371 (c)(1),
(2) Date: Mar. 13, 2017

(87) PCT Pub. No.: WO2016/044060
PCT Pub. Date: Mar. 24, 2016

(65) Prior Publication Data

US 2017/0285204 A1 Oct. 5, 2017

Related U.S. Application Data

(60) Provisional application No. 62/050,564, filed on Sep. 15, 2014.

(51) Int. Cl.
*G01V 1/00* (2006.01)
*G01V 1/42* (2006.01)
(Continued)

(52) U.S. Cl.
CPC ............... *G01V 1/42* (2013.01); *G01H 9/004* (2013.01); *G01V 1/36* (2013.01); *G01V 2210/1429* (2013.01); *G01V 2210/56* (2013.01)

(58) Field of Classification Search
CPC .... G01V 1/42; G01V 1/36; G01V 2210/1429; G01V 2210/56; G01H 9/004
See application file for complete search history.

(56) References Cited

U.S. PATENT DOCUMENTS

| | | | | |
|---|---|---|---|---|
| 6,065,538 A * | 5/2000 | Reimers | E21B 23/03 | 166/250.01 |
| 6,643,590 B2 * | 11/2003 | Wiggins | G01V 1/282 | 702/16 |

(Continued)

OTHER PUBLICATIONS

International Search Report and Written Opinion received for PCT Patent Application No. PCT/US2015/049451, dated Dec. 4, 2015, 10 pages.

*Primary Examiner* — Krystine E Breier

(57) ABSTRACT

A method may include providing a sensor in a first wellbore segment, providing a sensor in a second wellbore segment, observing upgoing acoustic waves or downgoing acoustic waves with the sensors, and separating the upgoing acoustic waves and/or the downgoing acoustic waves from a total wavefield. The first wellbore segment and the second wellbore segment may be separated by a distance. At least one of the wellbore segments may be non-vertical and/or the first wellbore segment may not be parallel to the second wellbore segment. The first wellbore segment may be part of a first set of wellbores and the second wellbore segment may be part of a second set of wellbores. The separated upgoing and downgoing acoustic waves may be used to generate deghosted data.

13 Claims, 4 Drawing Sheets

(51) Int. Cl.
*G01V 1/36* (2006.01)
*G01H 9/00* (2006.01)

(56) References Cited

U.S. PATENT DOCUMENTS

| | | | | |
|---|---|---|---|---|
| 6,747,915 | B2 | 6/2004 | Calvert | |
| 7,046,581 | B2 | 5/2006 | Calvert | |
| 7,120,541 | B2 * | 10/2006 | Wang | G01V 1/48 702/11 |
| 7,706,211 | B2 * | 4/2010 | Bakulin | G01V 1/303 367/38 |
| 8,681,583 | B2 * | 3/2014 | Kratz | G01V 1/288 367/14 |
| 9,354,341 | B2 * | 5/2016 | Beasley | G01V 1/364 |
| 9,494,461 | B2 * | 11/2016 | Hornman | G01V 1/40 |
| 9,880,047 | B2 * | 1/2018 | Martin | G01D 5/35361 |
| 2002/0103606 | A1 | 8/2002 | Fokkema et al. | |
| 2006/0221768 | A1 | 10/2006 | Hall et al. | |
| 2006/0262645 | A1 | 11/2006 | Van Baaren | |
| 2007/0195643 | A1 | 8/2007 | Bakulin et al. | |
| 2012/0024051 | A1 | 2/2012 | Lopez et al. | |
| 2013/0201792 | A1 * | 8/2013 | Douma | G01V 1/364 367/24 |
| 2014/0092708 | A1 | 4/2014 | Cotton et al. | |
| 2014/0257705 | A1 * | 9/2014 | Levin | G01V 1/42 702/11 |
| 2014/0345388 | A1 | 11/2014 | Den Boer et al. | |
| 2017/0212256 | A1 * | 7/2017 | Friedly | G01V 1/18 |

* cited by examiner

METHOD AND SYSTEM FOR ACQUISITION OF SEISMIC DATA

CROSS-REFERENCE TO RELATED APPLICATIONS

The present application is a National Stage (§ 371) application of PCT/US2015/049451, filed Sep. 10, 2015, which claims the benefit of U.S. Provisional Application No. 62/050,564, filed Sep. 15, 2014, which is incorporated herein by reference in its entirety.

FIELD OF THE INVENTION

The invention relates to a method and a system for acquisition of seismic data. The method and system may include installation of sensors placed in non-vertical wellbores resulting in vertically separated detectors to record upgoing and downgoing acoustic waves. The method and system may include deghosting.

BACKGROUND

Land seismic data acquisition and processing may be used to generate a profile of the geophysical structure under the surface of the earth. Those trained in the field can use the profile to predict the presence or absence of hydrocarbon accumulations or other geological features. Thus, a high-resolution profile, without error, is frequently preferred over a profile of low-resolution or having a larger margin of error.

Traditionally, a land seismic survey involves the use of seismic sensors and a seismic source. The sensors (e.g., geophones, hydrophones, accelerometers, etc.) are connected to each other and then deployed on or below the surface of the earth. The seismic source is activated and generates seismic waves which propagate through the subsurface until they are reflected and/or refracted by various heterogeneities in the subsurface. The reflected and/or refracted waves propagate to the seismic sensors, where they are recorded. The recorded seismic waves may be used, among other things, for seismic monitoring of producing oil fields if the seismic surveys are repeated over time.

Seismic repeatability, a measure of the fidelity with which a seismic survey is repeated and therefore of its ultimate resolution of changes with time, may be improved when sources and sensors are buried. However, such configuration results in a part of the wave field being reflected in a manner that provides noise. For example, an upwardly directed wave may be transmitted through the weathering layer and reflected at the surface of the earth before observation by the sensor. These surface reflected waves, often called "ghosts," are affected by the near surface variations and can change over time. The presence of surface reflected waves that fluctuate in time due to temperature and moisture variation in the near-surface may interfere with observations of waves coming from the reservoir or other formations of interest thereby preventing accurate measurement of small reservoir variations.

Techniques for "deghosting" the observations have been developed for both marine and land-based observations. Deghosting sometimes involves placement of vertically spaced sensor arrays (e.g., sensor pairs). By comparing the timing at which various waves are detected at the sensor arrays, it can be determined which of the signals are ghosts and which contains useful seismic data. On land, a wellbore is drilled for each vertically-spaced sensor array. The drilling of a vertical hole for each receiver station with a set of vertically separated receivers per receiver station results in a large drilling effort with high costs and a large environmental imprint.

SUMMARY OF THE INVENTION

In one aspect there is provided a method and a system comprising a sensor in a first wellbore segment in a formation and providing a sensor in a second wellbore segment in the formation. The first wellbore segment and the second wellbore segment are separated by a (non-zero) distance and at least one of these wellbore segments is non-vertical. Preferably both the first wellbore segment and the second wellbore segment are non-vertical. The sensor in the first wellbore segment and the sensor in the second wellbore segment intersect a vertical line in the formation. The method may further include observing upgoing acoustic waves or downgoing acoustic waves with the sensors and separating the upgoing acoustic waves and/or the downgoing acoustic waves from a total wavefield. The system may further include a readout system for observing the upgoing acoustic waves or downgoing acoustic waves with the sensors, and a computer processor adapted to separate the upgoing acoustic waves and/or the downgoing acoustic waves from the total wavefield.

BRIEF DESCRIPTION OF THE FIGURES

The figures are schematic only, and not drawn to scale. Identical reference numbers used in different figures correspond to similar components, elements, or features.

DETAILED DESCRIPTION

As compared with traditional methods, the methods described herein allow for the replacement of the numerous vertical wellbores with corresponding imaginary vertical wellbores. Essentially, sensors at varying depths approximately intersect a vertical line through the formation. Such configuration may reduce the environmental impact of the numerous vertical wellbores and also provide a cost savings in drilling of the wellbores. Additionally, the methods described herein may provide cost savings with respect to the configuration of the communications lines between the various sensors and the corresponding collection point of data observed by such sensors.

Figure 1:
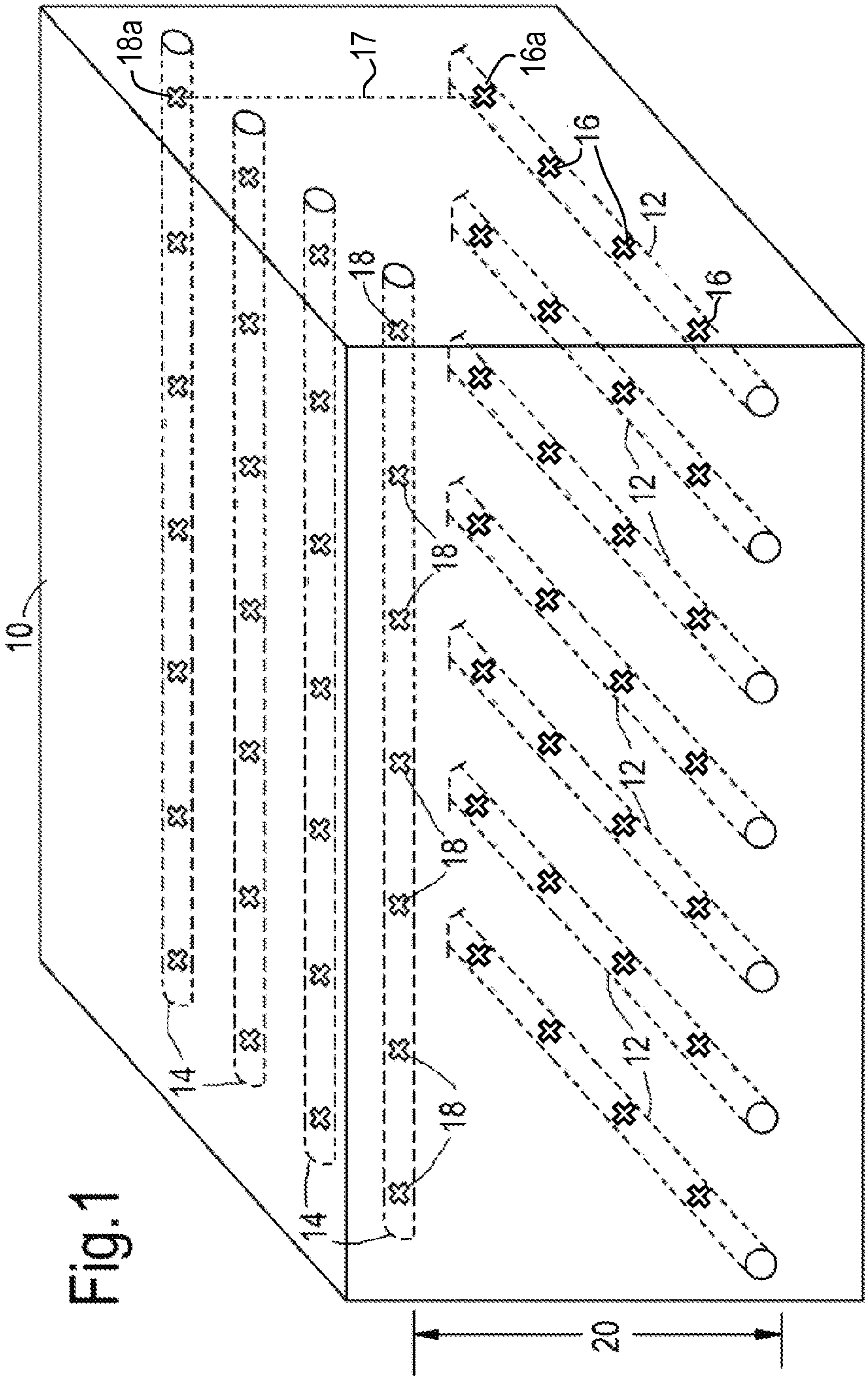
FIG. 1 is a perspective view of a first set of wellbores and a second set of wellbores used for deghosting seismic data in one example employing the teachings of the present disclosure.
Figure 2:
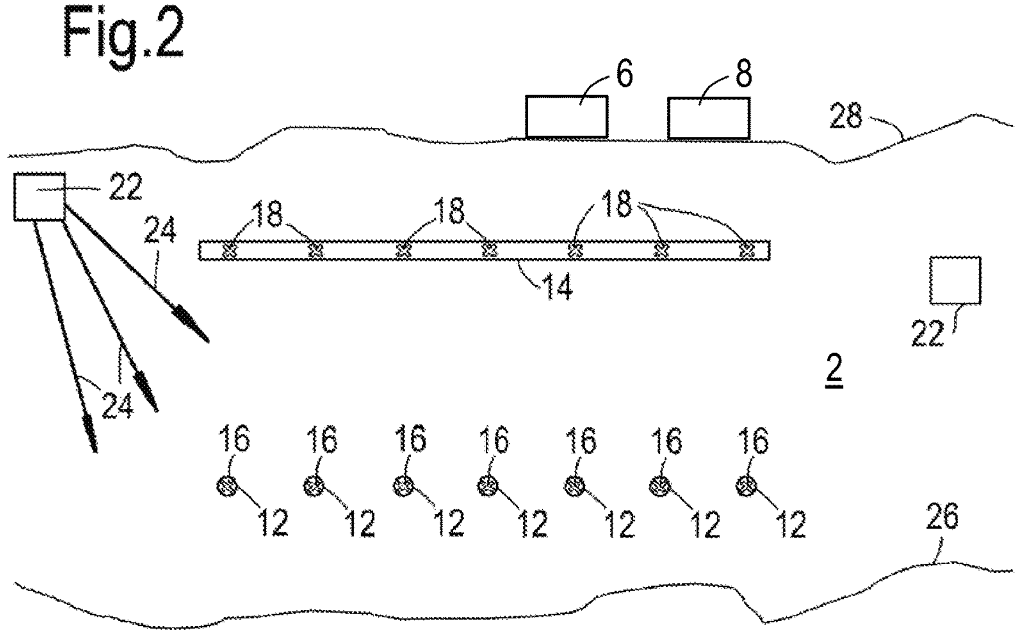
FIG. 2 is a cross-sectional side view showing one of the second set of wellbores as relates to the first set of wellbores of FIG. 1.

Referring now to the drawings, FIG. 1 illustrates a perspective view of a cube 10 representing a three-dimensional space through which a first set 12 of wellbore segments passes and through which a second set 14 of wellbore segments passes. The wellbore segments are comprised in wellbores which extend beyond the wellbore segments. The top surface of the cube may be deemed a simplified representation of the surface of the earth while the bottom surface may be deemed a simplified representation of a feature of interest, both of which are illustrated in FIG. 2. As illustrated in FIG. 1, the wellbore segments in both the first set 12 and the second set 14 are horizontal and very shallow (e.g., less than 50 meters below the surface of the earth). However, other variants are envisioned, so long as the wellbore segments are not vertical or substantially vertical. The wellbores may be drilled according to known methods, but the placement of the wellbore segments may be selected based on the following teachings. At least one of the sets of wellbore segments is non-vertical. Preferably, the first set 12 is not parallel to the second set 14. As illustrated in FIG. 1, the first 12 and second 14 sets of wellbore segments have azimuths that are offset by approximately 90 degrees. Thus, as illustrated, for a particular wellbore in the first set 12 and a particular wellbore in the second set 14, there is one location where the two wellbore segments are nearest one another. In the illustration, sensors are indicated as being present in each wellbore to take measurements at that proximal location.

Each of the wellbore segments in the first set 12 has at least one sensor 16 therein, and each of the wellbore segments in the second set 14 has at least one sensor 18 therein. The sensors may be placed in the wellbore segments according to known methods, but the placement of the sensors may be selected based on the teachings of this disclosure. As illustrated in FIG. 1, each of the wellbore segments in the first set 12 has 4 sensors 16 and each of the second set 14 has 7 sensors 18, although, for the sake of clarity, not all sensors are labeled. The sensors 16 and 18 may be geophones, or other point sensors connected via a string and placed in the respective wellbore. Alternatively, the sensors 16 and 18 may be comprised in distributed acoustic sensors, such that observations can be made at any of a number of locations along the corresponding wellbore. For example, any or each of the wellbores may have a distributed acoustic sensor therein which is divided in one or more channels each representing one sensor, and that sensor may be configured to observe acoustic waves from a source at multiple locations. In some or all instances, the distributed acoustic sensor may comprise an optical fiber that is helically wound in a cable disposed in the corresponding wellbore, such as described in US patent publication No. 2014/0345388 which is hereby incorporated by reference in its entirety. The cable may be disposed longitudinally within the wellbore and following the same trajectory as the wellbore. As a result of the helical trajectory of the optical fiber within the cable, the distributed acoustic sensor cable is broad side sensitive to seismic wave components in the plane perpendicular to the cable where the seismic wave interacts with the cable. While the helically wound optical fiber is a very useful option, broad side sensitivity may be achieved in other ways as well. Broad side sensitivity can be an important factor for non-vertically directed wellbore sections (especially horizontal directed wellbore sections) as the upgoing and downgoing seismic waves typically have a strong vertical component.

Pairs of sensors (whether point sensors or channels in distributed acoustic sensors) consisting of one sensor **16*a* in one first wellbore segment 12 and one sensor 18*a* in one second wellbore segment 14, intersect a vertical line 17 in the formation. The sensors may be aligned such that an observation can be made from the first set 12 and from the second set 14 at points within a predetermined proximity of one another. As illustrated in FIG. 1, that proximity is a vertical distance 20 which is uniform among the first 12 and second 14 sets. However, if the planes of the first 12 and second 14 sets of wellbore segments are not parallel, the vertical distance 20 may be different for a given pair of a wellbore section from the first set 12 and a wellbore second from the second set 14. Additionally, in some instances, the predetermined proximity may allow for multiple measurements to be taken at or near the same vertical distance 20**.

Referring now to FIG. 2, a system and method for recording an upgoing reflection and a downgoing receiver ghost of that reflection may include providing the sensors in the wellbore segments described above, providing a source 22 in a location expected to provide useful results, and activating the source 22. The source 22 may be configured to transmit acoustic waves 24 into a formation 2 or feature 26 of interest for subsequent observation by at least one sensor 16 in the first set 12 and by at least one sensor 18 in the second set 14. A readout system 6 may be provided for observing upgoing acoustic waves and/or downgoing acoustic waves with the sensors 16,18.

The source 22 may be located within a wellbore, which may suitably be one of wellbores that comprises the first or second wellbore segment.

The method may include observing upgoing acoustic waves and/or downgoing acoustic waves with the sensors, and separating the upgoing acoustic waves and/or the downgoing acoustic waves from a total wavefield. The method may further include generating deghosted data from the separated upgoing and downgoing acoustic waves. For example, a substantially deghosted scattered acoustic wavefield in a spectral domain may be created. Further, the substantially deghosted scattered acoustic wavefield may be transformed to a space-time domain, using known methods, such as described in U.S. Patent Publication 2002/0103606 to Fokkema et al. and U.S. Patent Publication 2014/0092708 to Cotton et al. which are both hereby incorporated by reference in their entirety. Said deghosted data may correct or otherwise filter waves created with interference from the surface of the earth 28. A computer processor 8 may be provided to receive data representing the observed upgoing or downgoing waves as observed by the sensors and to separate the upgoing acoustic waves and/or the downgoing acoustic waves from the total wave field.

In a variation, the source 22 may not be one that is activated to transmit waves but may instead be a passive or natural source such as micro-seismic. Similarly, the source 22 may not be separate from the sensors and the wellbores but may be a virtual source, such as is described in U.S. Pat. Nos. 7,706,211; 6,747,915; and 7,046,581, which are hereby incorporated by reference in their entirety.

The pairing of sensors in the first and second wellbore segments allows for a vertical sensor alignment (illustrated by line 17 in FIG. 1) for readings that can be used to provide a deghosted scattered acoustic wavefield. Specifically, individual sensors from skewed (or otherwise non-parallel) wellbores may be separated by the vertical distance 20 but may otherwise align or substantially align. In some instances, this vertical distance 20 may be fairly small. For example, the vertical distance for deghosting purposes is typically less than a seismic wavelength. The vertical distance 20 may be measured in a variety of ways. For example, by an average vertical depth of the first set 12 as compared to an average vertical depth of the second set 14. In other instances, the vertical distance 20 may be measured as the minimum distance between points in a particular wellbore segment from the first set 12 and a particular wellbore segment from the second set 14. Additionally, the vertical distance 20 need not be uniform, but may vary in instances where one or more wellbore segments in the first set 12 is skewed with respect to one or more wellbore segments in the second set 14.

Suitably, the first wellbore segment is comprised in one wellbore of the first set of wellbores whereby the second wellbore segment is comprised in one wellbore of the second set of wellbores. It will be understood that the first set of wellbores and the second set of wellbores may each consist of one or more wellbores. It will be understood that the wellbore(s) in the second set of wellbores may be separate from the wellbore(s) in the first set of wellbores in the sense that these wellbores never cross each other within the subsurface formation (i.e. they are fully separated from each other by the formation).

Figure 3:
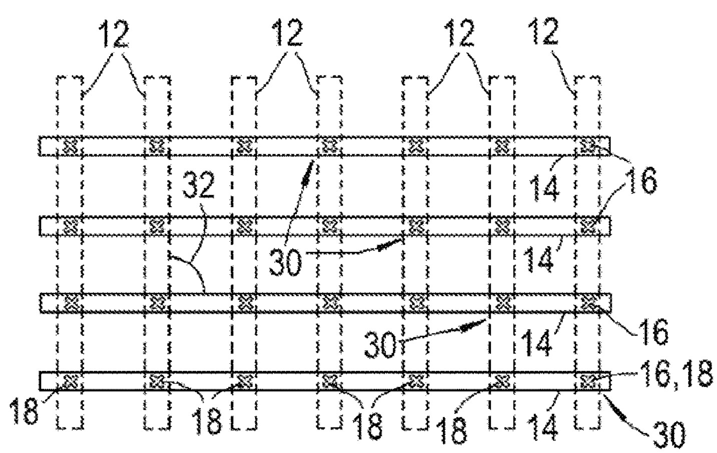
FIG. 3 is a cross-sectional top view showing multiple of the second set of wellbores as relates to the first set of wellbores of FIG. 1.

Referring now to FIG. 3, when the azimuth of the first set 12 is offset from the azimuth of the second set 14 by 90 degrees, a top view orthogonal to both sets of wellbore segments indicates the wellbore segments intersecting such that the sensors 16 in the first set 12 and the sensors 18 in the second set 14 overlap with crossings occurring at an angle 32 of 90 degrees. Thus, when there are 7 wellbore segments in the first set 12 and 4 wellbore segments in the second set 14, there are 28 intersections 30, or 28 points where the distance 20 between any particular two of the wellbore segments is locally at a minimum. Similarly, when the first set 12 includes 4 wellbore segments and the second set 14 includes 3 wellbore segments, there would be 12 intersections 30. Likewise, with 7 wellbore segments in each of the first 12 and second 14 sets of wellbore segments, there would be 49 intersections 30. At each of those intersections 30, there is an imaginary vertical line 17 having two points of reference, one in each of the sets 12 and 14 of wellbore segments, which can be used for deghosting.

Nonetheless, the invention can be embodied using two non-vertical wellbore segments which do not both lie within a single vertical plane. This configuration can yield one point of vertical alignment if the non-vertical wellbore segments are not parallel to one another and the wellbore segments are separated from each other by a distance. More points of vertical alignment can be achieved by increasing the number of wellbores. Assuming each wellbore has one wellbore segment in which the sensors are configured and assuming there M straight wellbore sections in the first set of wellbores and N straight wellbore sections in the second set of wellbores, then mathematically, the number of points of vertical alignment can advantageously exceed the number of wellbores if the condition $M+N>4$ is met, wherein both M and N are natural numbers greater than one.

Alternatively, an entire line of vertically aligned points can be achieved if both wellbore segments are non-vertical and both lie within a single vertical plane and are separated from each other by a distance.

Figure 4:
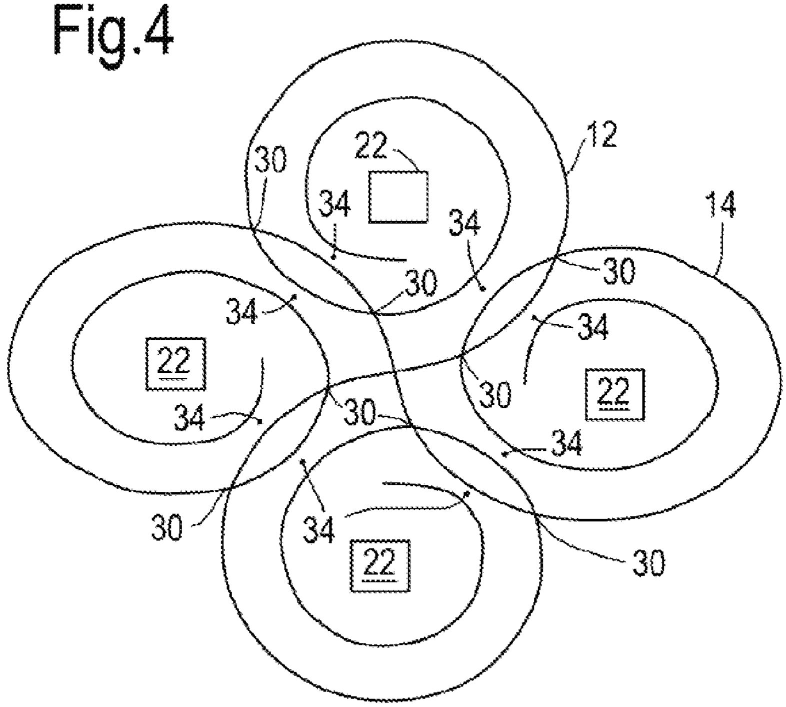
FIG. 4 is a simplified cross-sectional top view showing an alternative second wellbore as relates to an alternative first wellbore.

While FIGS. 1-3 illustrate embodiments where the wellbore segments of the first set 12 are substantially parallel to one another and where the wellbore segments of the second set 14 are substantially parallel to one another and both sets 12, 14 are substantially parallel to a plane representing the surface of the earth 28, other configurations, while more complex, may also work. For example, the sets of wellbore segments may be interlaced, may overlap, or may otherwise be configured to acoustic waves 24 or other signals of interest. Not only may the wellbore segments of a set be non-parallel but they may be nonlinear. For example, with reference to FIG. 4, a simplified top view of an alternative layout for the first 12 and second 14 sets of wellbore segments (with the width of the wellbores and indication of sensor placement being neglected for simplicity) may involve a curved pattern with the proximity points being intersections 30 (i.e., where the x and y coordinates are identical but the z coordinate indicates the vertical distance 20) and/or points of close proximity 34 (i.e., where the x and y coordinates are close but the z coordinate indicates the vertical distance 20). Such configuration may allow for calculations using spiral geometries such as those described in U.S. Patent Application 2012/0024051 to Lopez et al. which is hereby incorporated by reference in its entirety.

Figure 5:
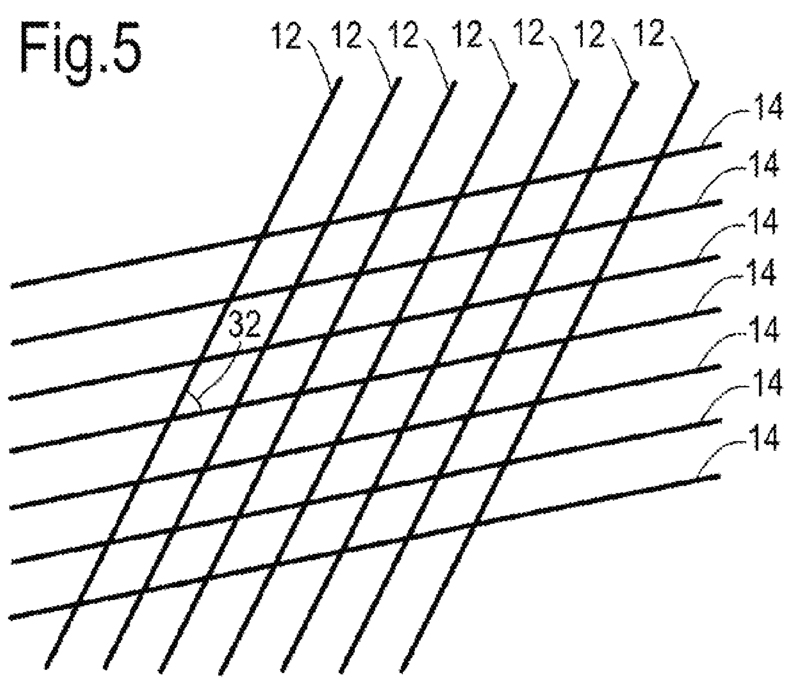
FIG. 5 is a simplified cross-sectional top view showing an alternative second set of wellbores as relates to an alternative first set of wellbores.

Referring now to FIG. 5, a simplified cross-sectional top view of another configuration indicates that the azimuths of the first 12 and second 14 sets of wellbore segments may be offset by an angle 32 other than 90 degrees. For example, the angle 32 between a particular wellbore segment from the first set 12 and a particular wellbore segment from the second set 14 may be between about 10 degrees and about 170 degrees, between about 20 degrees and about 160 degrees, between about 30 degrees and about 150 degrees, between about 45 degrees and 135 degrees, between about 60 degrees and about 120 degrees, between about 70 degrees and about 110 degrees, between about 80 degrees and about 100 degrees, about 90 degrees, or exactly 90 degrees, or any other angle as well as the complement of that angle to 180 degrees. The particular circumstances will dictate the angle 32 between the sets of wellbores. Stated differently, seen in a vertical projection, a particular wellbore segment from the first set 12 may be perpendicular to a particular wellbore segment from the second set 14 within about 80 degrees from true perpendicular, or within about 70 degrees, within about 60 degrees, within about 45 degrees, within about 30 degrees, within about 20 degrees, or within about 10 degrees from true perpendicular, or the particular wellbore segment from the first set 12 may be about perpendicular to the particular wellbore segment from the second set 14 or exactly perpendicular (seen in said vertical projection).

In addition to the configurations indicated above, other spiral, grid, slanted grid, or other configurations may be used to geometrically optimize spacing and provide maximum illumination and/or minimum borehole length. For example, where the receiver ghost is varying slowly in the horizontal direction, the wellbores may have variations in vertical depth, either slanted boreholes, sinusoidally shaped boreholes in a vertical plane or helically shaped boreholes. In any event, by combining measurements from adjacent sensors located at different depths, it may be possible to obtain an estimate of the receiver ghost.

As illustrated, sensors 16 and 18 are only present in locations where an intersection 30 is expected. However, it should be noted that additional sensors may be included, particularly when using distributed acoustic sensors, such that additional measurements may be taken, providing potentially enhanced data. For example, observations may be taken at very short intervals, such as every 4 meters or even shorter along a borehole.

Additional variations may be included without departing from the scope of the present disclosure. For example, while first and second sets of wellbores are illustrated, similar advantages may be attained using only first and second wellbore segments. Thus, a method may include providing a sensor in a first wellbore segment and providing a sensor in a second wellbore segment before observing acoustic waves with the sensors. In such method, the two sensors may both be part of a distributed acoustic or other sensor or they may be separate sensing apparatus. The observed acoustic waves may include upgoing acoustic waves and/or downgoing acoustic waves and the method may involve separating the upgoing acoustic waves and/or the downgoing acoustic waves from a total wavefield. Likewise, acoustic waves may be replaced with other wave types, including shear or elastic waves. As with the wellbore sets described above, the first and second well segments may be separated by a distance and the segments may be non-parallel to one another. Such segments could be located within a single wellbore, e.g., when the configuration of that wellbore would allow for the wellbore segments to otherwise provide the characteristics described above (e.g. non-vertical and/or non-parallel, and separated by a distance). Notably, for such a configuration, segments in a wellbore are deemed parallel if those segments both lie along a line or in a vertical plane. Alternatively, such segments could be located in separate wellbores, each of which is part of a set of wellbores as described above.

Figure 6:
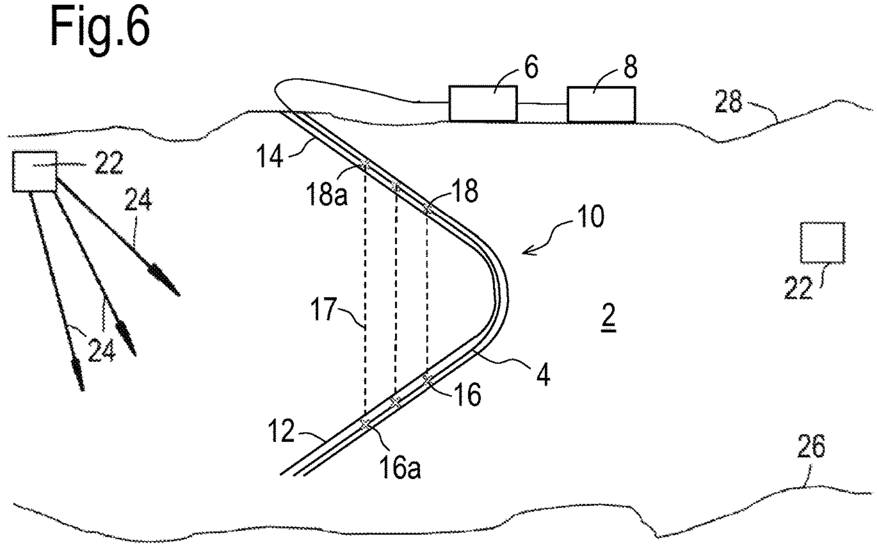
FIG. 6 is a cross-sectional side view showing an embodiment of the invention wherein the first wellbore segment and the second wellbore segment are located within a single non-linear wellbore.

FIG. 6 provides a schematic pictorial illustration of a possible configuration wherein the first wellbore segment 12 and the second wellbore segment 14 are located within a single non-linear wellbore 10. Particularly, but not exclusively, when the trajectory of the non-linear wellbore 10 lies within a vertical plane, sensors pairs such as sensor 16*a* and 18*a* can be provided within the first wellbore segment 12 and second wellbore segment 14, respectively, such that said sensor 16*a* in said first wellbore segment 12 and said sensor 18*a* in said second wellbore segment 14 intersect a vertical line 17 in the formation 2. For purposes of illustration, the each sensor 16, 16*a*, 18, 18*a* is comprised in a distributed acoustic sensor deployed in a cable 4, which is connected to an optical readout system 6 for observing upgoing acoustic waves or downgoing acoustic waves with the sensors. The optical readout system 6 is connected to a computer processor 8 adapted to separate the upgoing acoustic waves and/or the downgoing acoustic waves from the total wave field and optionally to perform one or more further optional data processing steps described herein. The optical readout system 6 may comprise an internal data storage device, or it may be in data communication with an external data storage device (not shown). Such data storage device, external or internal, may be connected to the computer processor 8.

The term “horizontal” as used herein is not intended to mean strictly orthogonal to a vertical orientation but is meant to include many different non-vertical wellbores. Specifically, “horizontal” should include all wellbores more than 45 degrees deviated from vertical, as well as wellbores having a horizontal reach that is substantially larger than the vertical reach. For example, slanted wells may be deemed horizontal wells.

The term “wellbore” as used herein is not intended to be limited to boreholes that perform the function of a well such as producing fluids from the formation such as water and/or mineral hydrocarbon fluids. Rather, wellbore is used as pars pro toto intended to include any type of borehole drilled within the formation.

It is believed that various advantages may flow from the designs of the current disclosure. For example, the use of distributed acoustic sensors, including helically wound cable, may allow for a significantly reduced number of communication lines as compared with present methods which require at least one communication line running from each vertical wellbore (i.e., one communication line for every sensor-pair location). The designs disclosed above may allow for a reduction in communication lines as compared to conventional methods. Additionally, when using distributed acoustic sensing, fewer sensors may be used. Another potential advantage is fewer wellbores being drilled. In the presently disclosed methods, the intersections provide data similar to what might be attained in a vertical well, but with fewer wells. As indicated in one example above, 7 wells in the first set and 7 wells in the second set provides 49 intersections or points whereby sensors are placed in a stacked configuration. To attain similar data with vertical wells would require the drilling of 49 wells, instead of only 14. Since each well has a surface footprint, the environmental benefits from the reduction in the number of wellbores are clear.

In summary, the method disclosed herein may include providing a sensor in a first wellbore segment, providing a sensor in a second wellbore segment, observing upgoing acoustic waves and/or downgoing acoustic waves with the sensors, and separating the upgoing acoustic waves and/or the downgoing acoustic waves from a total wavefield. The first wellbore segment and the second wellbore segment may be separated by a distance. At least one of the wellbore segments may be non-vertical and/or the first wellbore segment may not be parallel to the second wellbore segment. The first wellbore segment may be part of a first set of wellbores and the second wellbore segment may be part of a second set of wellbores. The separated upgoing and downgoing acoustic waves may be used to generate deghosted data.

Certain embodiments of the method disclosed herein are optionally summarized in the following clauses:

Clause 1: a method comprising:

providing a sensor in a first wellbore segment;

providing a sensor in a second wellbore segment; and observing upgoing acoustic waves or downgoing acoustic waves with the sensors; and separating the upgoing acoustic waves and/or the downgoing acoustic waves from a total wave field;

wherein the first wellbore segment and the second wellbore segment are separated by a distance; and wherein the first wellbore segment is not parallel to the second wellbore segment and/or wherein at least one of the wellbore segments is non-vertical.

Clause 2: the method of Clause 1, wherein the first wellbore segment is part of a first set of wellbores, wherein the second wellbore segment is part of a second set of wellbores.

Clause 3: the method of Clause 1, comprising generating deghosted data from the separated upgoing and downgoing acoustic waves.

Clause 4: the method of Clause 3, wherein generating deghosted data comprises generating a substantially deghosted scattered acoustic wavefield.

Clause 5: the method of Clause 1, further comprising, before observing, activating a source configured to transmit acoustic waves into a formation of interest, wherein the upgoing acoustic waves and the downgoing acoustic waves originate at the source.

Clause 6: the method of Clause 5, wherein the source is a virtual source.

Clause 7: the method of Clause 1, wherein each sensor comprises a distributed acoustic sensor.

Clause 8: the method of Clause 7, wherein each sensor is helically wound in a cable disposed in the corresponding wellbore segment.

Clause 9: the method of Clause 1, wherein the first wellbore segment and the second wellbore segment are substantially horizontal.

Clause 10: the method of Clause 2, wherein the first set of wellbores comprises 4 wellbores and wherein the second set of wellbores comprises 3 wellbores.

Clause 11: the method of Clause 2, wherein the first set of wellbores comprises 7 wellbores and wherein the second set of wellbores comprises 7 wellbores.

Clause 12: the method of Clause 2, wherein the first set of wellbores are substantially parallel to one another and wherein the second set of wellbores are substantially parallel to one another.

Clause 13: the method of Clause 1, wherein each of the wellbore segments are nonlinear.

Clause 14: the method of Clause 1, wherein at least one of the wellbore segments comprises a sinusoidal or helical shape.

Clause 15: the method of Clause 1 or Clause 13, wherein the first wellbore segment and the second wellbore segment are located within a single wellbore.

Those of skill in the art will appreciate that many modifications and variations are possible in terms of the disclosed embodiments, configurations, materials, and methods without departing from their scope. Accordingly, the scope of the claims and their functional equivalents should not be limited by the particular examples described and illustrated, as these are merely representative in nature and elements described separately may be optionally combined.

The invention claimed is:

1. A method comprising:

providing a sensor in a first wellbore segment in a formation;

providing a sensor in a second wellbore segment in the formation; and observing upgoing acoustic waves or downgoing acoustic waves with the sensors; and separating the upgoing acoustic waves and/or the downgoing acoustic waves from a total wave field;

wherein the first wellbore segment and the second wellbore segment are non-vertical and separated by a distance;

wherein the first wellbore segment and the second wellbore segment do not both lie with a single vertical plane and are not parallel to each other; and wherein said sensor in said first wellbore segment and said sensor in said second wellbore segment intersect a vertical line in the formation.

2. The method of claim 1, wherein the first wellbore segment is part of a first set of wellbores, wherein the second wellbore segment is part of a second set of wellbores.

3. The method of claim 2, wherein the wellbores of the first set are substantially parallel to one another and wherein the wellbores of the second set are substantially parallel to one another.

4. The method of claim 3, wherein the first set of wellbores comprises M wellbores and the second set of wellbores comprises N wellbores, subject to a condition $M+N>4$, wherein both M and N are natural numbers greater than one.

5. The method of claim 1, comprising generating deghosted data from the separated upgoing and downgoing acoustic waves.

6. The method of claim 5, wherein generating deghosted data comprises generating a substantially deghosted scattered acoustic wavefield.

7. The method of claim 1, further comprising, before observing, activating a source configured to transmit acoustic waves into a formation of interest, wherein the upgoing acoustic waves and the downgoing acoustic waves observed with the sensors originate at the source.

8. The method of claim 1, wherein each sensor is comprised in a distributed acoustic sensor.

9. The method of claim 8, wherein the distributed acoustic sensor is helically wound in a cable disposed in the corresponding wellbore segment, wherein the cable is disposed parallel to the corresponding wellbore segment.

10. The method of claim 1, wherein the first wellbore segment and the second wellbore segment are substantially horizontal.

11. The method of claim 1, wherein a vertical distance between the sensor in said first wellbore segment and the sensor in said second wellbore segment is less than a seismic wavelength of the upgoing and downgoing waves.

12. The method of claim 1, wherein each of the wellbore segments is nonlinear.

13. A system comprising:

a sensor in a first wellbore segment in a formation;

a sensor in a second wellbore segment in the formation;

a readout system for observing upgoing acoustic waves or downgoing acoustic waves with the sensors; and a computer processor adapted to separate the upgoing acoustic waves and/or the downgoing acoustic waves from a total wave field;

wherein the first wellbore segment and the second wellbore segment are non-vertical and separated by a distance;

wherein the first wellbore segment and the second wellbore segment do not both lie within a single vertical plane and are not parallel to each other; and wherein said sensor in said first wellbore segment and said sensor in said second wellbore segment intersect a vertical line in the formation.

* * * * *